United States Patent
Lin

(10) Patent No.: US 8,281,679 B2
(45) Date of Patent: Oct. 9, 2012

(54) SLIDE MECHANISM

(75) Inventor: Chun-Jen Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 505 days.

(21) Appl. No.: 12/579,582

(22) Filed: Oct. 15, 2009

(65) Prior Publication Data

US 2011/0017001 A1  Jan. 27, 2011

(30) Foreign Application Priority Data

Jul. 27, 2009 (CN) .......................... 2009 1 0304887

(51) Int. Cl.
*F16F 1/18* (2006.01)

(52) U.S. Cl. .. 74/100.1; 267/159; 267/164; 379/433.12; 455/575.4

(58) Field of Classification Search ................ 74/100.1, 74/100.2; 379/433.12; 455/575.4; 267/159, 267/164

See application file for complete search history.

(56) References Cited

U.S. PATENT DOCUMENTS

| 2,410,680 | A | * | 11/1946 | Rasmussen et al. | ......... 74/100.2 |
| 5,735,610 | A | * | 4/1998 | Mark et al. | ...................... 384/42 |
| 2009/0320628 | A1 | * | 12/2009 | Huang | .......................... 74/100.2 |

FOREIGN PATENT DOCUMENTS

JP  60-4297  * 1/1985

* cited by examiner

*Primary Examiner* — William C Joyce
(74) *Attorney, Agent, or Firm* — Altis Law Group, Inc.

(57) ABSTRACT

A slide mechanism includes a main body, a slide body and an elastic member. The slide body is slidably connected to the main body. The elastic member is positioned between the main body and the slide body. The main body includes a base plate and two guide rails fixed on opposite sides of the base plate. The guide rails are elastic. A distance between the guide rails is less than a length of the elastic member in a normal state. Opposite ends of the elastic member are fixed to the guide rails, and a middle portion of the elastic member is fixed to the slide body, so that the elastic member remains bent between the guide rails.

13 Claims, 6 Drawing Sheets

SLIDE MECHANISM

BACKGROUND

1. Technical Field

The present disclosure relates generally to slide mechanisms and, more particularly, to a slide mechanism for a portable electronic device.

2. Description of Related Art

Currently, sliding portable electronic devices are becoming increasingly used. Most sliding portable electronic devices are configured with a first housing, a second housing and a slide mechanism connecting the second housing with the first housing. A keypad is configured in the first housing, and a display is configured in the second housing. The second housing slides over the first housing via the slide mechanism, thereby opening/closing the sliding portable electronic device.

A typical slide mechanism includes a main plate, a slide plate and a spring positioned between the main plate and the slide plate. A first end of the spring is riveted to the main plate, and a second end of the spring is riveted to the slide plate. The main plate is fixed to the first housing and the slide plate is fixed to the second housing of the sliding portable electronic device.

When the sliding portable electronic device is closed, the spring is relaxed. When the second housing slides relative to the first housing, the slide plate slides relative to the main plate, and the spring is gradually compressed. When the slide plate reaches a midpoint of the main plate, the spring is maximally deformed, generating a maximum elastic energy. The slide plate automatically slides by resilient force of the spring immediately after passing the middle of the main plate. The second housing can slide over the first housing when the slide plate slides relative to the main plate. When the sliding portable electronic device is opened, the spring returns to its original state.

However, when the sliding portable electronic device is fully closed or opened, the spring is generally in the normal state, and cannot generate resilient force. Thus, the sliding portable electronic device may not stably remain in the closed/opened state, and requires a fixing structure to position the second housing on the first housing.

Therefore, a slide mechanism which overcomes the described limitations is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
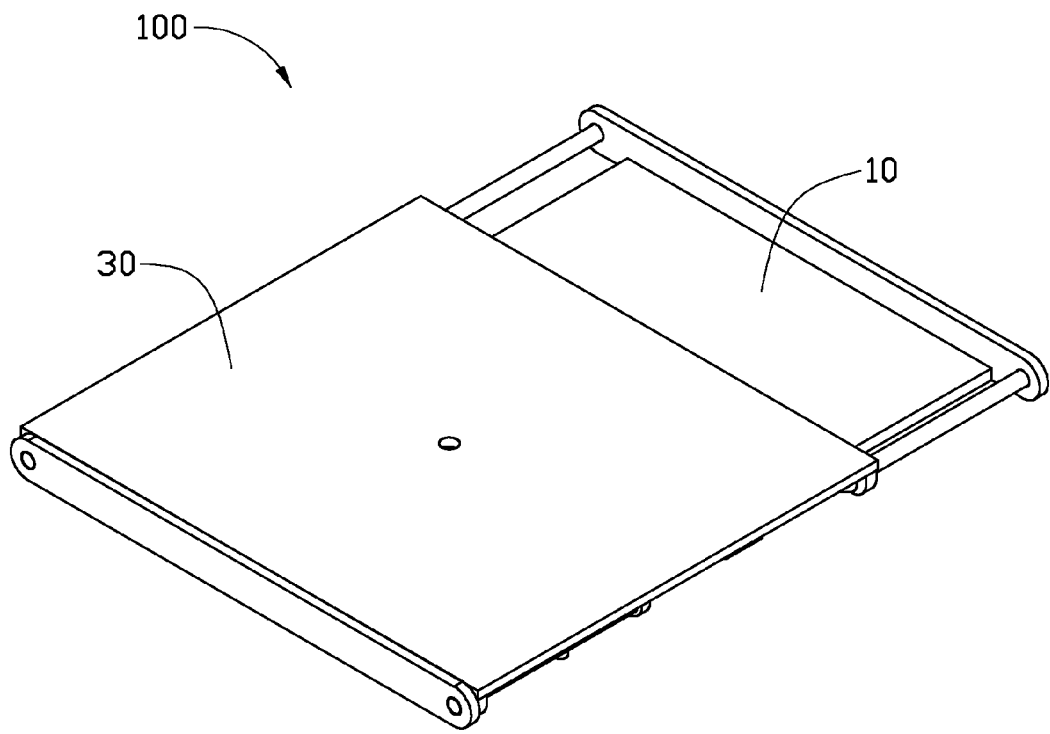
FIG. 1 is an isometric view of an embodiment of a slide mechanism.
Figure 2:
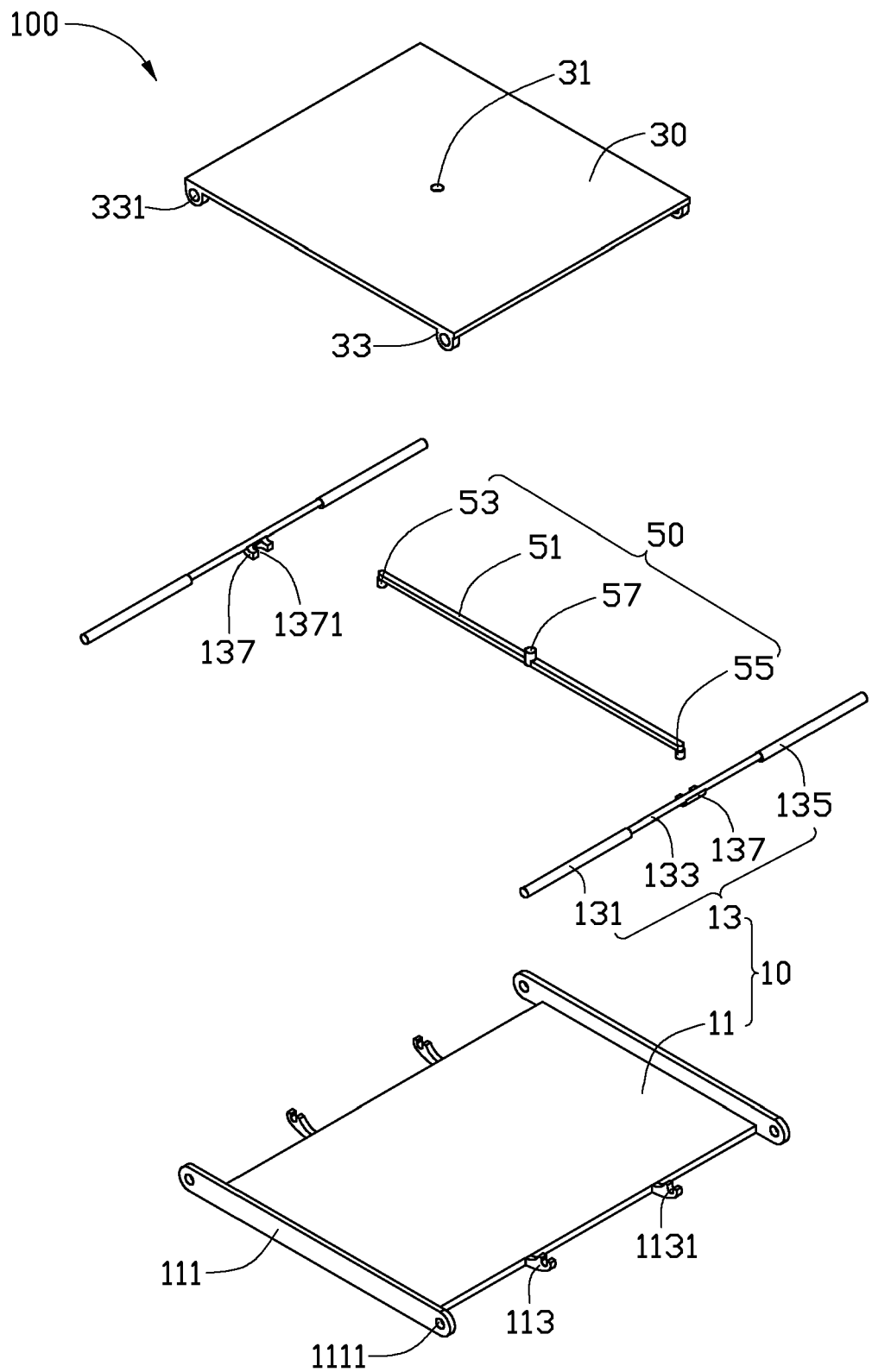
FIG. 2 is an exploded, isometric view of the slide mechanism of FIG. 1.

Referring to FIGS. 1 and 2, an embodiment of a slide mechanism 100 includes a main body 10, a slide body 30 and an elastic member 50. The slide body 30 is slidably connected to the main body 10. The elastic member 50 is positioned between the slide body 30 and the main body 10.

Figure 3:
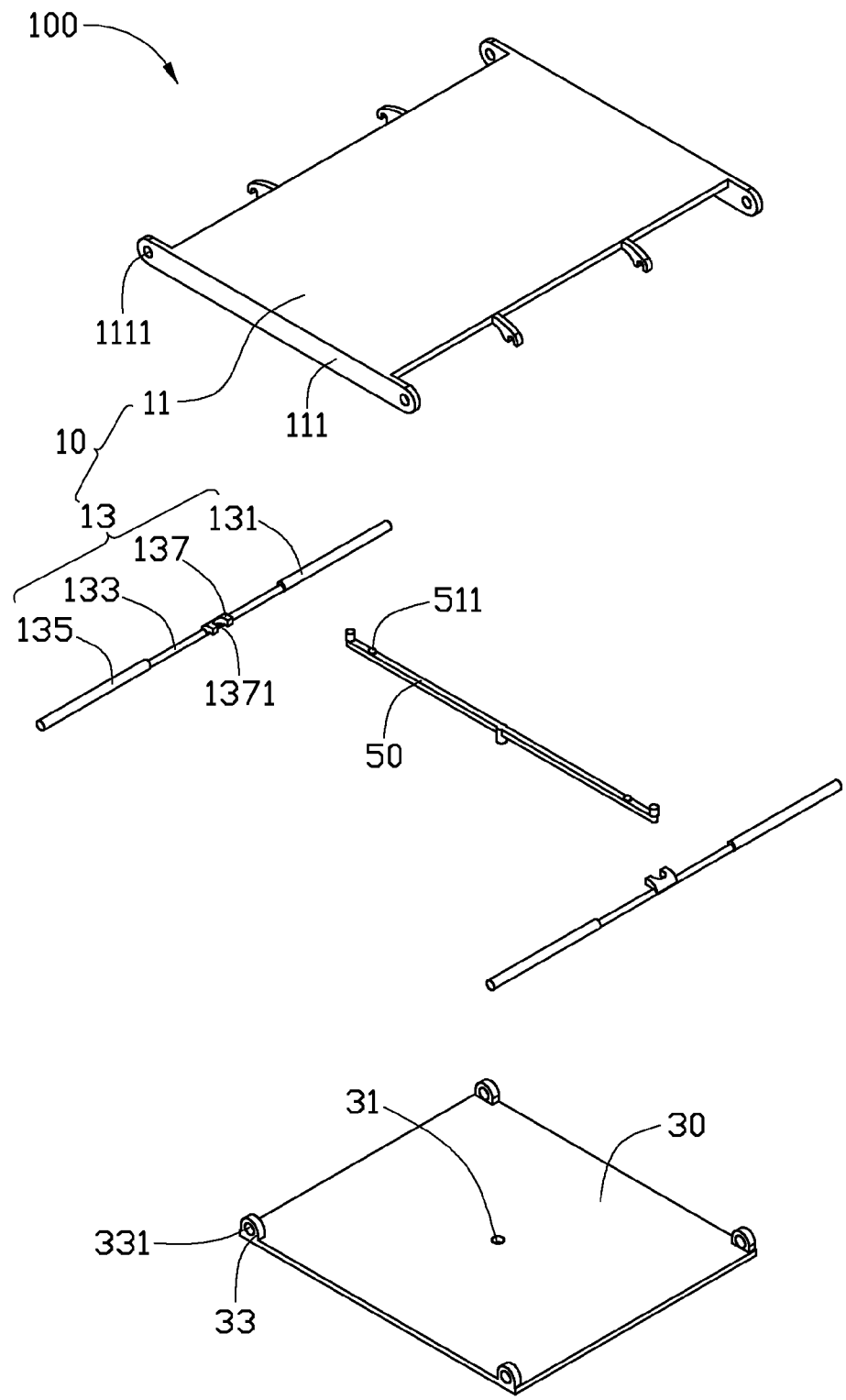
FIG. 3 is similar to FIG. 2, but viewed from another aspect.

Referring to FIGS. 2 and 3, the main body 10 includes a base plate 11 and two guide rails 13 positioned on opposite sides of the base plate 11.

Two assembly plates 111 are formed on opposite ends of the base plate 11. Each assembly plate 111 defines two assembly holes 1111 in opposite ends thereof. One or more restricting portions 113 are formed on each side of the base plate 11. Each restricting portion 113 defines a restricting groove 1131 in an end. In the illustrated embodiment, two restricting portions 113 are formed on each side of the base plate 11.

Each guide rail 13 is a substantially stepped post, and includes a first section 131, a second section 133, a third section 135, and a positioning portion 137. The positioning portion 137 is fixed on the second section 133. In the illustrated embodiment, the first, second and third sections 131, 133, 135 are substantially cylindrical. A diameter of the first section 131 is equal to that of the third section 135, and exceeds that of the second section 133. The second section 133 is elastic, but is stiffer than the elastic member 50. The positioning portion 137 defines a positioning groove 1371.

The slide body 30 is a substantially rectangular flat plate in this embodiment, and defines a connecting hole 31 in a center portion. A plurality of assembling portions 33 are formed on the slide body 30. In the illustrated embodiment, four assembling portions 33 are formed on four corners of the slide body 30 respectively, and each assembling portion 33 defines an assembly hole 331.

The elastic member 50 includes an elastic bar 51, a first fixing portion 53, a second fixing portion 55, and a third fixing portion 57. The first fixing portion 53 and the second fixing portion 55 are formed on opposite sides of the elastic bar 51. The third fixing portion 57 is formed on a middle portion of the elastic bar 51. Two support protrusions 511 are further formed on opposite sides of the elastic bar 51, respectively, adjacent to the first fixing portion 53 and the second fixing portion 55. A distance between the first fixing portion 53 and the second fixing portion 55 exceeds a distance between the guide rails 13. The elastic member 50 is integrally formed of plastic material.

Figure 4:
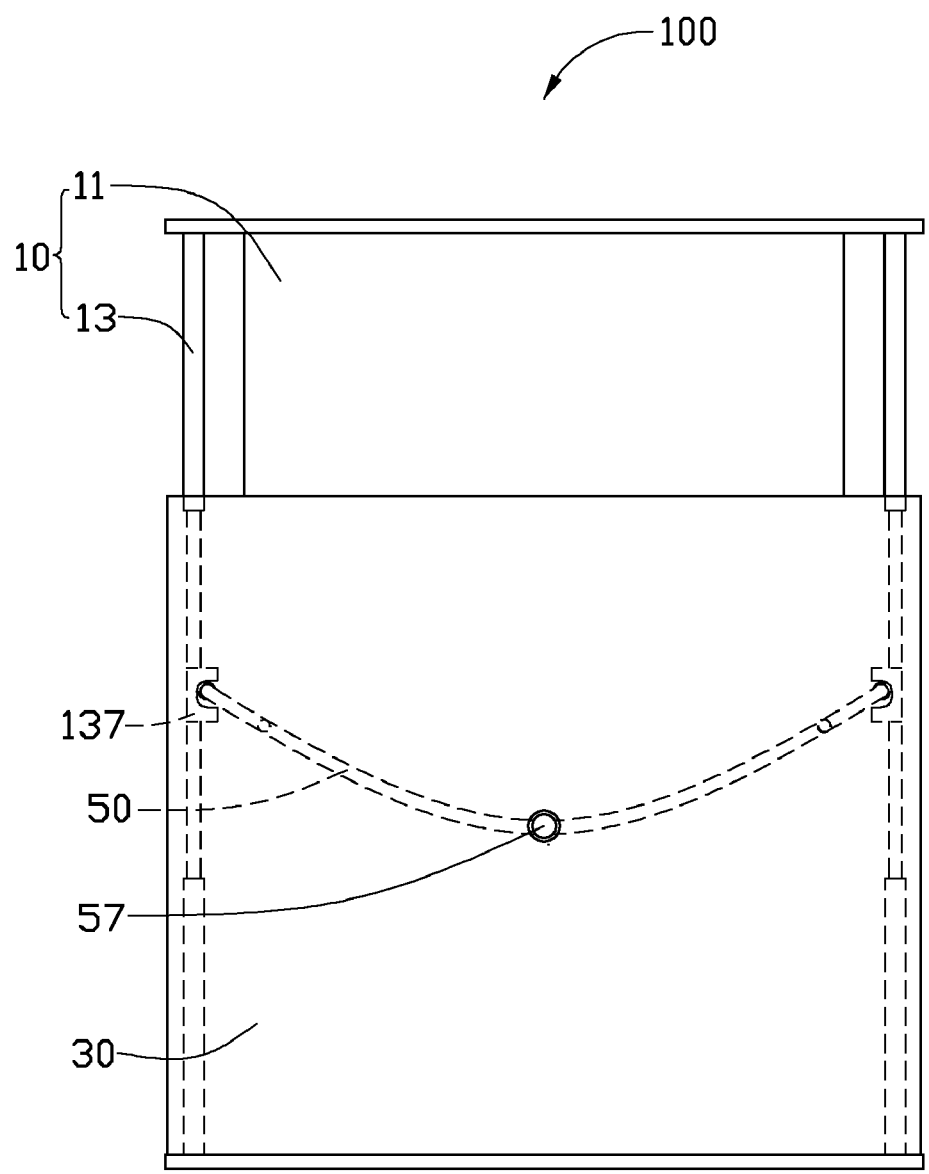
FIG. 4 is a top plan view of the slide mechanism of FIG. 1 showing the slide body closed relative to the main body.

During assembly of the slide mechanism 100, the first section 131 and third section 135 of each guide rail 13 extend through the assembly holes 1111 of the assembly plate 111, and the second section 133 of each guide rail 13 is partially engaged in the restricting grooves 1131 of the restricting portions 113. The assembling portions 33 of the slide body 30 are slidably sleeved on the guide rails 13. The first fixing portion 53 and the second fixing portion 55 are received in the positioning grooves 1371 of the positioning portions 137. The third fixing portion 57 is engaged in the connecting hole 31 of the slide body 30. The elastic member 50 is then bent into a curve between the guide rails 13 (as shown in FIG. 4), and the support protrusions 511 of the elastic bar 51 resist the base plate 11.

Figure 5:
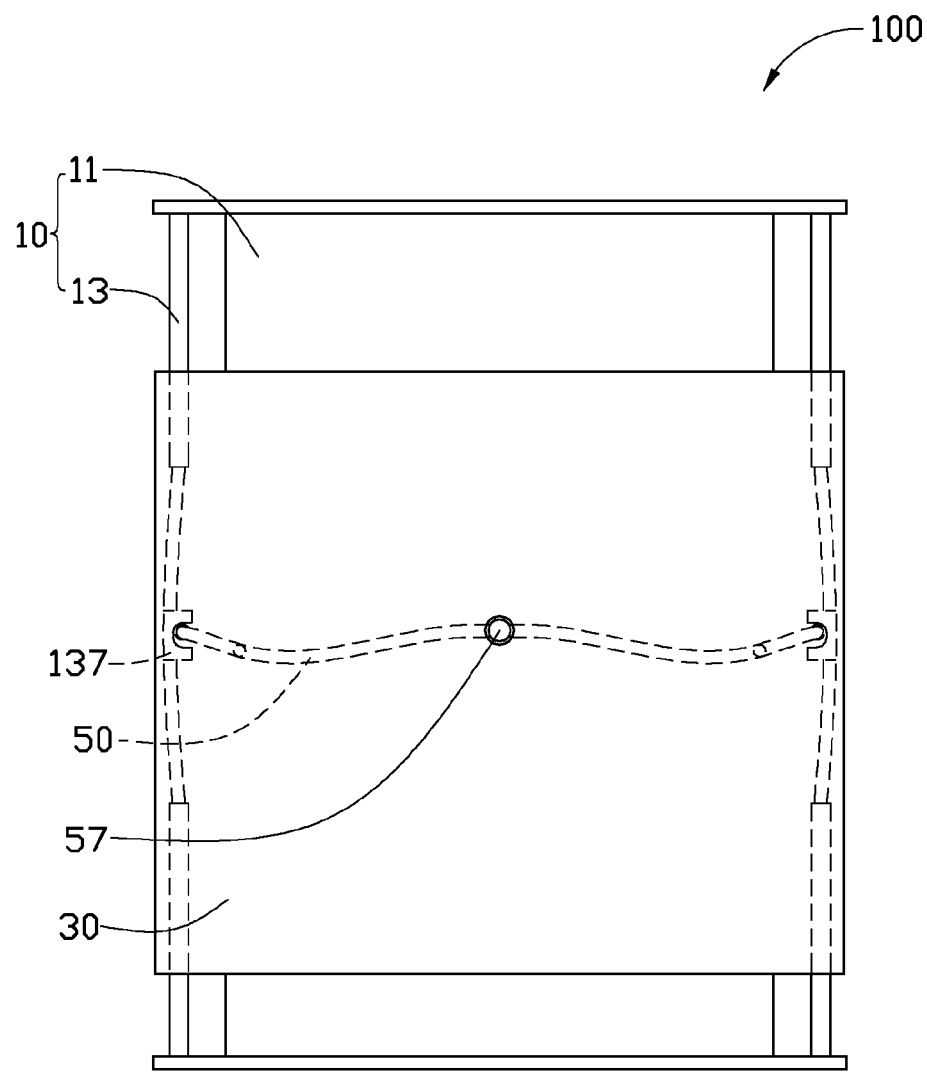
FIG. 5 is a top plan view of the slide mechanism of FIG. 1 showing the slide body in a middle position relative to the main body.
Figure 6:
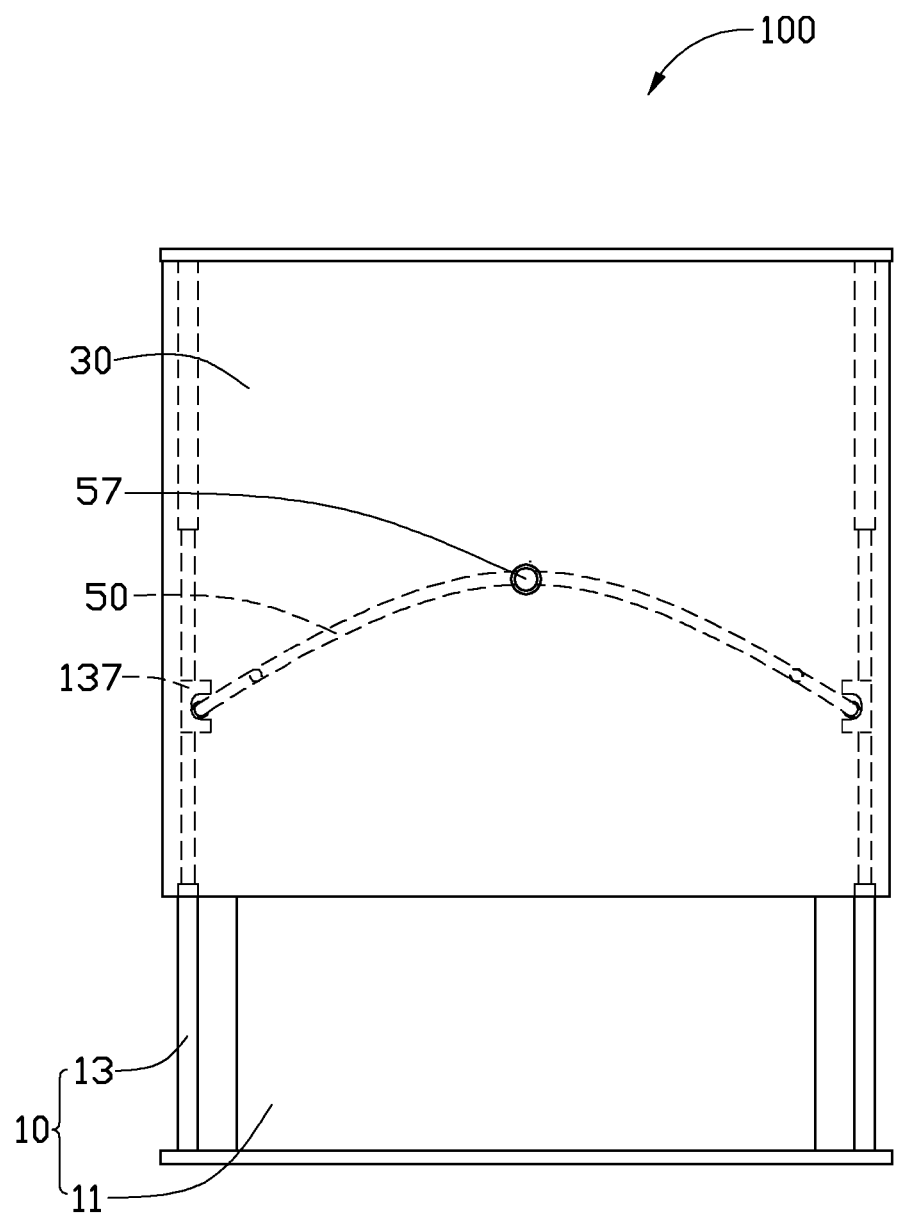
FIG. 6 is a top plan view of the slide mechanism of FIG. 1 showing the slide body open relative to the main body.

Referring to FIGS. 2 through 5, in use, the slide body 30 slides on the main body 10 in a first direction, and the elastic member 50 applies a resisting force on the guide rails 13, and the second sections 133 of the guide rails 13 are elastically deformed. When the guide rails 13 are maximally deformed, the elastic member 50 is further deformed. When the third fixing portion 57 of the elastic member 50 aligns with the positioning portions 137, the elastic bar 51 becomes wave-shaped deformed as shown in FIG. 5. The slide body 30 automatically slides under the resilient force of the elastic member 50 and a restoring force of the guide rails 13, immediately after the slide plate further slides in the first direction. When the slide body 30 reaches an end of the main body 10, the guide rails 13 return to their original state, and the elastic member 50 is bent again.

When the slide body 30 is at the end of the main body 10, the elastic member 50 is bent again because a distance between the guide rails is less than a length of the elastic member 50 in a normal state. Thus, the slide body 30 can be stably positioned on opposite ends of the main body 10 by the elastic force of the elastic member 50. That is, when the slide mechanism 100 is used in an electronic device (not shown), the electronic device can be stably maintained in a closed or opened state. The second sections 133 of the guide rails 13 can be deformed, so that the elastic member 50 can extend to sides of the main body 10, to slide the slide body 30 on the main body 10 smoothly. Furthermore, the slide body 30 can semi-automatically slide relative to the main body 10 in response to the resilient force produced by the elastic member 50 and the restoring force of the guide rails 13.

The elastic member 50 has the first fixing portion 53 and the second fixing portion 55 connected to the main body 10, and the third fixing portion 57 connected to the slide body 30. Thus, the slide mechanism 100 is easily assembled, requiring no fixing members such as rivets. The elastic member 50 is made of plastic and easily molded, thus having a light weight. In addition, the elastic member 50 contacts the main body 10 via support protrusions 511, thus reducing friction between the elastic member 50 and the main body 10.

It should be pointed out that the elastic member 50 may define two receiving holes in opposite ends to replace the first fixing portion 53 and the second fixing portion 55, and the guide rails 13 form protrusions received in the receiving holes of the elastic member 50. In addition, the guide rails 13 may be omitted in the slide mechanism 100, with the elastic member 50 directly connected to opposite sides of the main body 10.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A slide mechanism, comprising:
a main body comprising a base plate and two elastic guide rails fixed on opposite sides of the base plate;
a slide body slidably connected to the main body; and
an elastic member positioned between the main body and the slide body;
wherein each guide rail comprises a first section, a second section, a third section, the second section connects the first section to the third section, and the first section, the second section, and the third section are substantially cylindrical; the second section is elastic, and stiffer than the elastic member; a distance between the guide rails is less than a length of the elastic member in a normal state; opposite ends of the elastic member are fixed to the guide rails; a middle portion of the elastic member is fixed to the slide body, so that the elastic member remains bent between the guide rails.

2. The slide mechanism of claim 1, wherein the elastic member is made of plastic.

3. The slide mechanism of claim 2, wherein the elastic member comprises an elastic bar, a first fixing portion, a second fixing portion, and a third fixing portion formed on the elastic bar between the first fixing portion and the second fixing portion.

4. The slide mechanism of claim 3, wherein each guide rail further forms a positioning portion on the second section, each positioning portion defining a positioning groove;
the first fixing portion and the second fixing portion are engaged in the positioning grooves of the guide rails.

5. The slide mechanism of claim 4, wherein the slide body defines a connecting hole in a center portion thereof, the connecting hole engaging with the third fixing portion.

6. The slide mechanism of claim 1, wherein the main body further comprises two assembly plates formed on opposite ends of the base plate; each guide rail connects the assembly plates.

7. The slide mechanism of claim 6, wherein at least one restricting portion is formed on each side of the base plate, the at least one restricting portion defining a restricting groove in which the guide rail is partially received.

8. The slide mechanism of claim 1, wherein a plurality of assembling portions are formed on the slide body and sleeved on the guide rails.

9. The slide mechanism of claim 1, wherein a diameter of the first section is equal to that of the third section, and exceeds that of the second section.

10. A slide mechanism, comprising:
a main body comprising a base plate and two elastic guide rails fixed on opposite sides of the base plate;
a slide body slidably connected to the main body; and
an elastic member positioned between the main body and the slide body;
wherein each guide rail comprises a first section, a second section, a third section, the second section connects the first section to the third section, and the first section, the second section, and the third section are substantially cylindrical; the second section is elastic, and stiffer than the elastic member; the elastic member comprises a first fixing portion, a second fixing portion, and a third fixing portion between the first fixing portion and the second fixing portion;
the first fixing portion and the second fixing portion are connected to the main body, and the third fixing portion is connected to the slide body; a width of the main body is less than a length of the elastic member in a normal state, so that the elastic member remains bent and generates an elastic force applied to the slide body.

11. The slide mechanism of claim 10, wherein the elastic member is made of plastic.

12. The slide mechanism of claim 10, wherein the slide body defines a connecting hole in a center portion thereof, the connecting hole engaging with the third fixing portion.

13. The slide mechanism of claim 10, wherein a diameter of the first section is equal to that of the third section, and exceeds that of the second section.

* * * * *